US006418487B1

(12) United States Patent
Schelling et al.

(10) Patent No.: US 6,418,487 B1
(45) Date of Patent: Jul. 9, 2002

(54) METHOD TO TRACK AGENTS AFTER A LOSS OF STATE EVENT

(75) Inventors: Todd A. Schelling, Lafayette; Robert A. Branch, Hillsboro, both of OR (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/302,775

(22) Filed: Apr. 30, 1999

(51) Int. Cl.[7] .............................................. G06F 13/14
(52) U.S. Cl. .............................. 710/15; 714/47; 714/57; 714/102; 706/904
(58) Field of Search .............................. 710/15; 714/47, 714/57, 102; 706/904

(56) References Cited

U.S. PATENT DOCUMENTS

| 4,432,064 A | * | 2/1984 | Barker et al. ................ 364/550 |
| 5,333,240 A | * | 7/1994 | Matsumoto et al. ......... 395/904 |
| 5,504,863 A | * | 4/1996 | Yoshida ................. 395/184.01 |
| 5,646,864 A | * | 7/1997 | Whitney ................. 364/514 B |
| 5,883,621 A | * | 3/1999 | Iwamura ..................... 345/327 |
| 5,918,181 A | * | 6/1999 | Foster et al. ................. 455/456 |
| 5,923,247 A | * | 7/1999 | Dowden et al. ............. 340/506 |
| 6,006,019 A | * | 12/1999 | Takei ..................... 395/200.53 |
| 6,073,206 A | * | 6/2000 | Piwonka et al. ............ 711/102 |
| 6,173,422 B1 | * | 1/2001 | Kimura et al. ................ 714/57 |
| 6,253,339 B1 | * | 6/2001 | Tse et al. ...................... 714/47 |
| 6,263,455 B1 | * | 7/2001 | Bannister ...................... 714/25 |
| 6,263,458 B1 | * | 7/2001 | Miller et al. .................. 714/47 |

* cited by examiner

Primary Examiner—Jeffrey Gaffin
Assistant Examiner—Abdelmoniem Elamin
(74) Attorney, Agent, or Firm—Kenyon & Kenyon

(57) ABSTRACT

A method for tracking agents across loss of state events is described. After determining the number of terminal agents within a hierarchical agent system, an algorithm forms a first matrix containing data identifying agents within the hierarchical agent system. After a potential loss of state event has occurred, the algorithm forms a second matrix containing data identifying agents within the hierarchical agent system and compares the first matrix to the second matrix. If the matrices are identical, no agent switch occurred during the potential loss of state event. If the matrices are not identical, at least one agent switch occurred during the potential loss of state event.

28 Claims, 4 Drawing Sheets

METHOD TO TRACK AGENTS AFTER A LOSS OF STATE EVENT

BACKGROUND

The present invention relates to a method for tracking agents in a multilevel hierarchical structure across loss of state events.

Modern microprocessors often include agents attached to a communications bus that are intended to perform various functions. One particular structure of agents may be a multilevel, hierarchical structure where the agents in one level of the hierarchy are uniquely associated with one and only one agent located on the immediately higher level in the hierarchy. The highest level of this hierarchy is occupied by a single root agent that interfaces with a host, which performs other functions of the microprocessor.

Agents may be identified with a plurality of identifying variables that denote for example, the agents's location on the communications bus or purpose of operation. These variables may be categorized into two distinct groups: (1) variables that are a function of the agent's position in relation to other agents in the hierarchical communications bus structure ("dependent variables"); and (2) variables that are independent of the agent's relation to the position of other agents within the hierarchical communications bus structure ("independent variables").

During the operation of the microprocessor, agents may be added to a communications bus, removed from the communications bus, or switched from one place on the communications bus to another ("agent switches"). These agent switches may occur either while the microprocessor is operating or is not operating. In order to dynamically track the locations of agents along the communications bus structure, a check of the communications bus structure may be performed after each event where an agent switch could potentially occur ("loss of state event") to determine whether one or more agent switches did, in fact, occur during the loss of state event. In prior art systems such as the Extended System Configuration Data (ESCD), the tracking of an agent's position along a hierarchical communications bus structure after a loss of state event required the use of dependent variables. Because the values of the dependent variables associated with a particular agent may change after an agent moves locations within the communications bus structure, it was inefficient to determine whether one or more agent switches had taken place after a loss of state event. Accordingly, there is a need in the art for a system and method that tracks the locations of agents in a hierarchical communications bus structure after loss of state events that exclusively utilizes independent variables that do not depend on the location of any particular agent within a hierarchical multilevel communications bus structure.

SUMMARY

Embodiments of the present invention provide for a method including determining the number of terminal agents within a hierarchical agent system, forming a first matrix containing data identifying a plurality of agents within the hierarchical agent system, determining whether a potential loss of state event has occurred, forming a second matrix containing data identifying a plurality of agents within the hierarchical agent system and comparing the first matrix to the second matrix.

Detailed Description

The present invention solves the problem of tracking agent switches across loss of state events by use of an algorithm that first determines the number of terminal agents that are in a hierarchical communications bus at a particular time. Next, the algorithm records the path of the root agent to each terminal agent in a matrix using each agent's independent variable for identification. Finally, after a loss of state event occurs, the algorithm determines the path of the root agent to each terminal agent in the matrix and compares this matrix to the matrix recorded before the loss of state event occurred. If the matrices match, no agent switch occurred during the loss of state event; if the matrices do not match, at least one agent switch occurred during the loss of state event.

Figure 1:
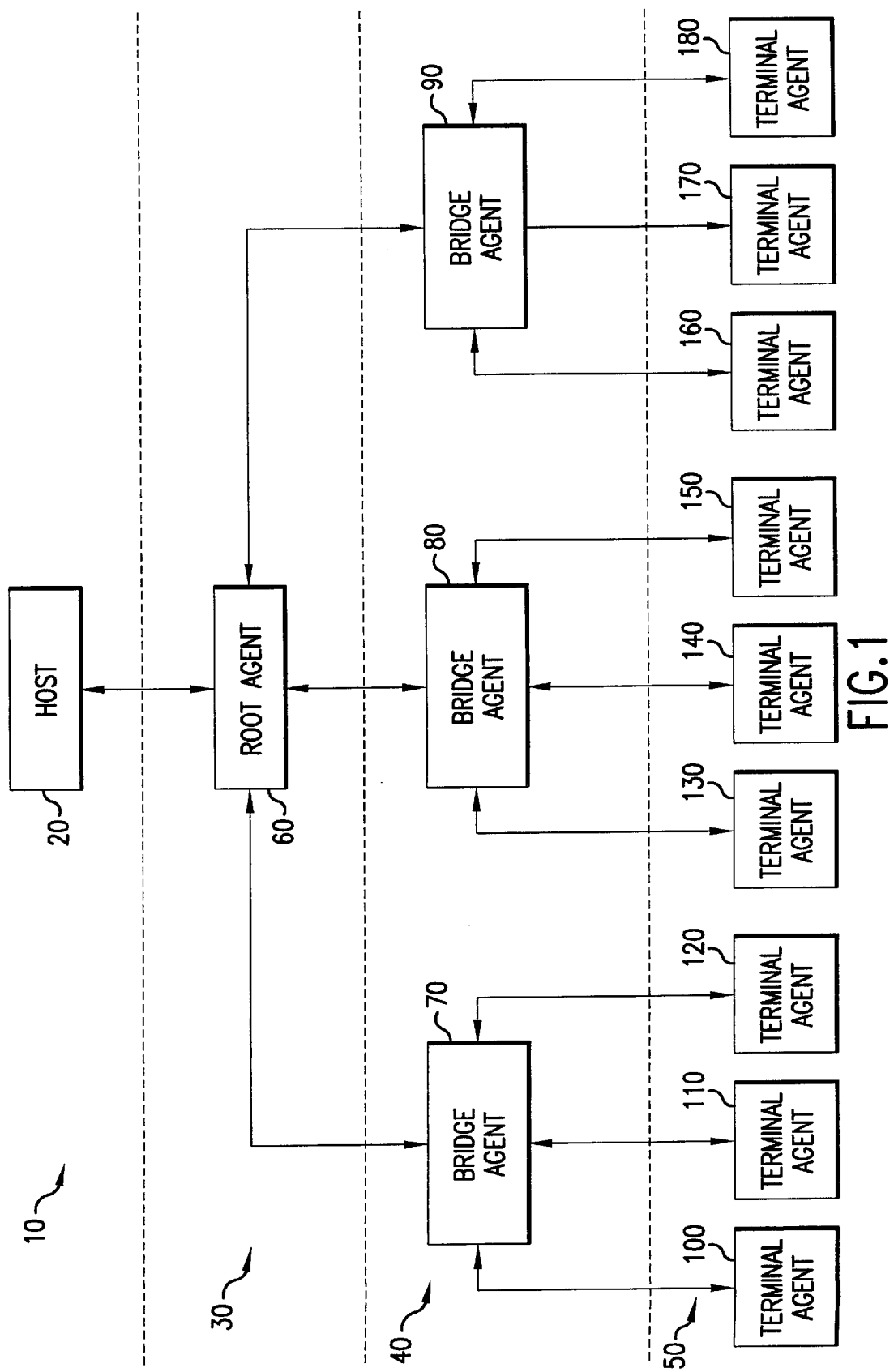
FIG. 1 is a block diagram of a multiple agent system in a communications bus in accordance with an embodiment of the present invention.

A communications bus structure in accordance with an embodiment of the present invention is shown in FIG. 1. FIG. 1 illustrates a communications bus structure 10 containing a host 20 connected to a root agent 60 at the root level 30. The root agent 60 is connected to a plurality of bridge agents 70, 80, 90 located at the first level below the root level 40. Each of the bridge agents 70, 80, 90 is connected to a plurality of terminal agents 100, 110, 120, 130, 140, 150, 160, 170, 180 at the second level below the root level 50. Each of the terminal agents 100, 110, 120, 130, 140, 150, 160, 170, 180 located at the second level below the root level 50 is associated with only one bridge agent 70, 80, 90 located at the first level below the root level 40. Bridge agents are those agents that have one or more agents associated with them at a level below that of the bridge agent. Terminal agents are those agents with no agent associated with them at a level below the terminal agent. FIG. 1 is only exemplary of the possible configurations of communications bus structure 10; further levels of agents that are uniquely associated with one agent at the next higher level in the hierarchy may be present in the communications bus structure 10.

Figure 2A:
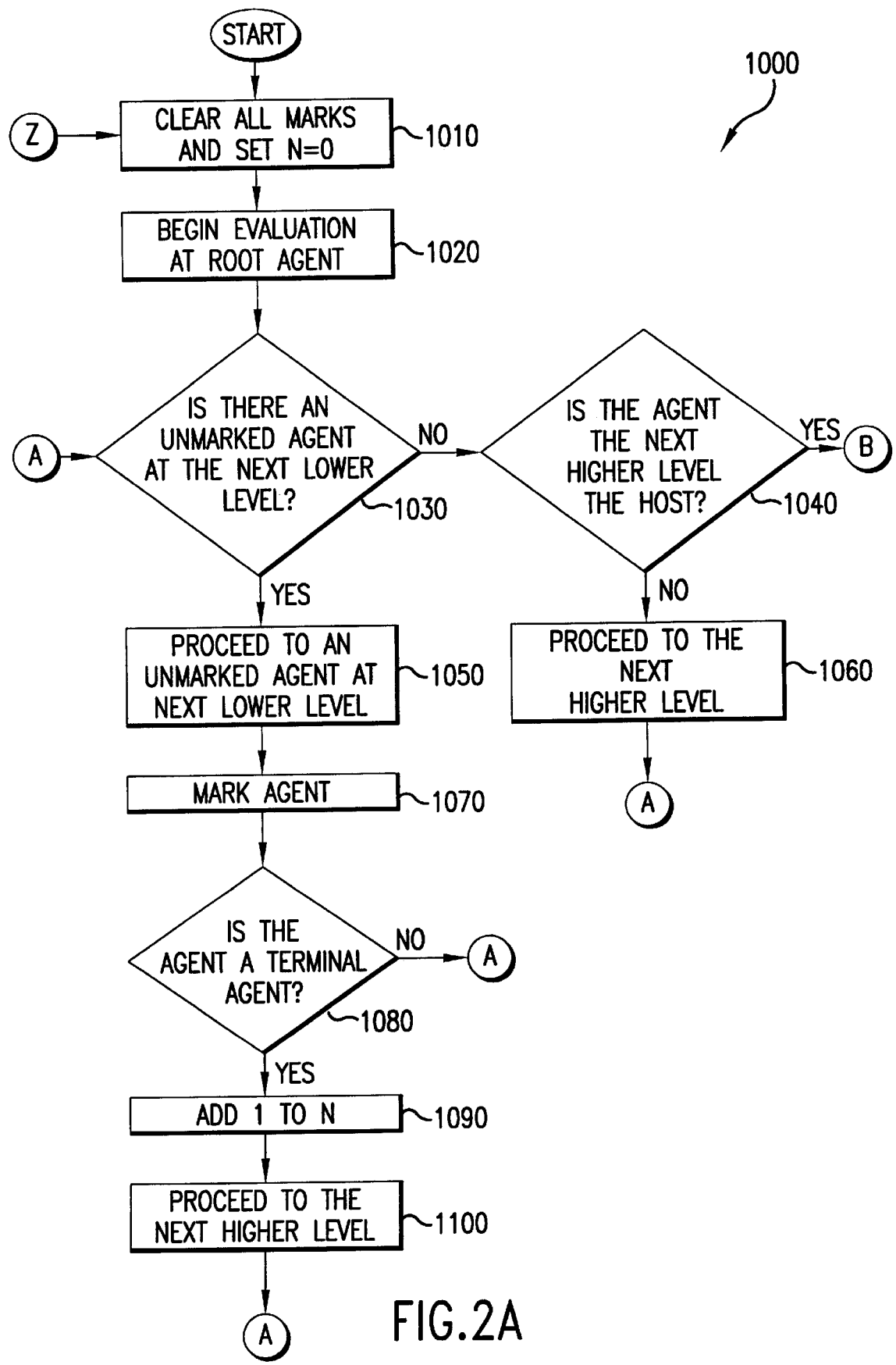
FIGS. 2A, 2B and 2C are block diagrams of a flowchart illustrating an embodiment of the present invention.
Figure 2B:
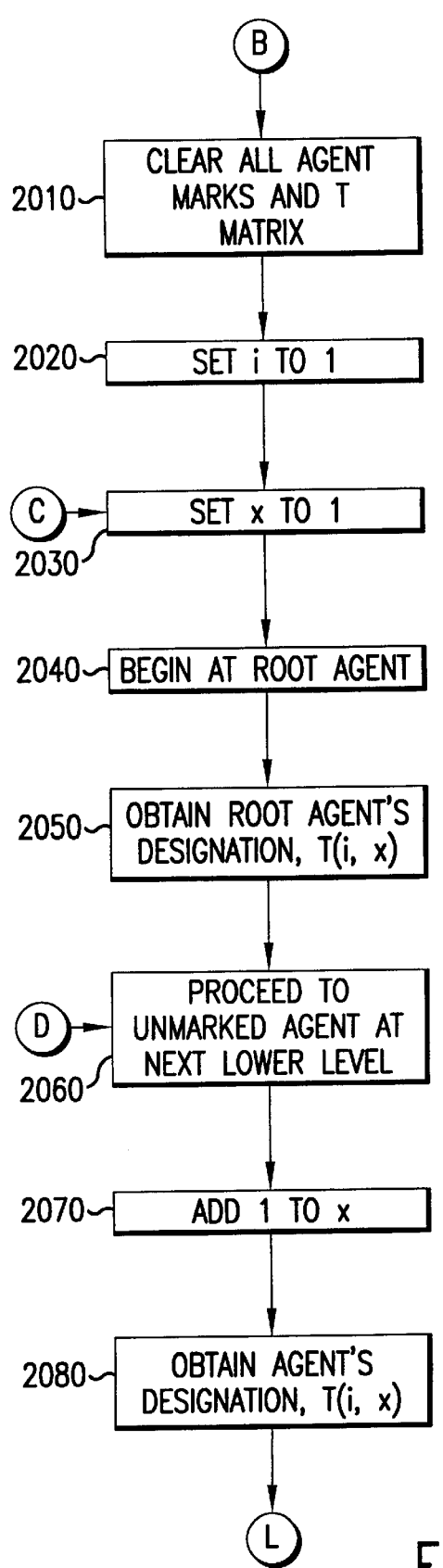
Figure 2B:
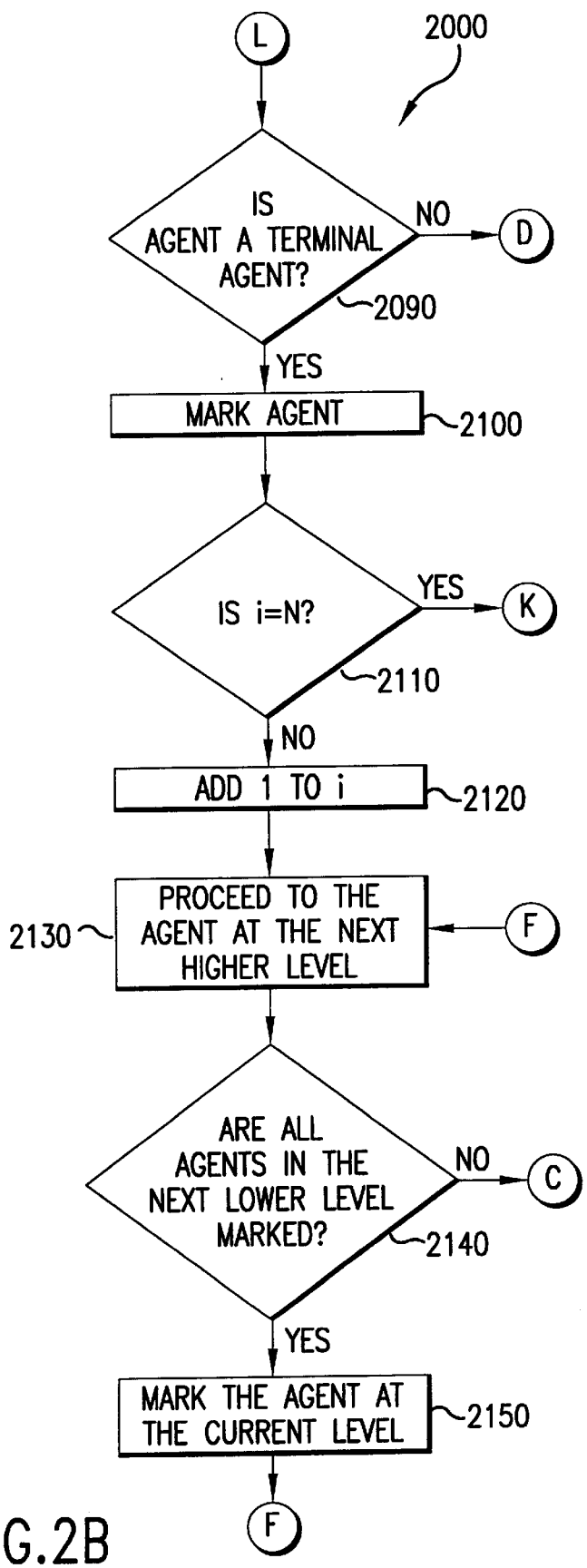
Figure 2C:
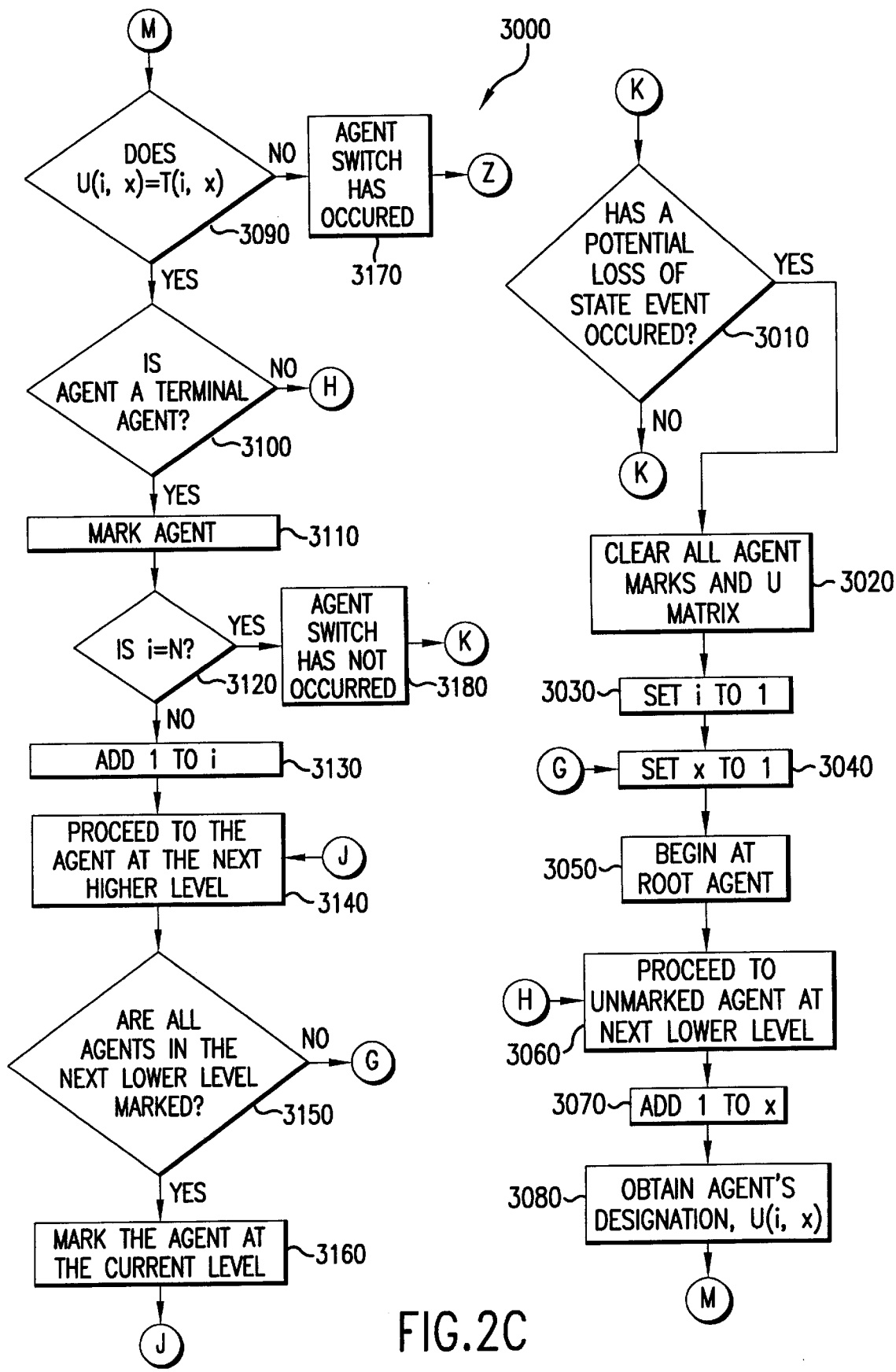

FIGS. 2A, 2B and 2C illustrate a flowchart of the algorithm that is an embodiment of the present invention. The first stage 1000 of an embodiment of the algorithm as shown in FIG. 2A is designed to determine the total number of terminal agents N that are present in a communications bus structure 10 at any given time. This stage of the algorithm begins by setting N to 0, clearing all agent marks throughout the communications bus structure 10 (Step 1010) and beginning the evaluation of the communications bus structure 10 at the root agent 60 (Step 1020). The algorithm next determines if there is at least one unmarked agent at the next lower level of hierarchy (Step 1030). If there is no such agent at the next lower level and the next higher level is the host, then all of the terminal agents have been counted and this stage of the algorithm is complete (Step 1040). If there is no such agent at the next lower level and the next higher level is not the host, there are still terminal agents to be counted. Thus, the algorithm proceeds to the next higher level (Step 1060) and again evaluates if there is at least one unmarked agent at the next lower level (Step 1030). If there is an unmarked agent at the next lower level, however, the algorithm proceeds to this agent (Step 1050), marks the agent (Step 1070), and determines if the agent is a terminal agent (Step 1080). If the agent is not a terminal agent, the algorithm determines if there is at least one unmarked agent at the next lower level of hierarchy (Step 1030) and continues as described above. If the agent is a terminal agent, the algorithm adds 1 to N (Step 1100), determines if there is at least one unmarked agent at the next lower level of hierarchy (Step 1030) and continues as described above. When the algorithm is complete, N will represent the number of terminal agents in the communications bus structure 10.

Once N is known at a given time through the above described algorithm or any other method, the algorithm may proceed to the second stage 2000, an embodiment of which is shown in FIG. 2B. The second stage 2000 of the algorithm is designed to build a matrix of data tracing and recording the path from the root agent to each terminal agent using each agent's independent variable for identification of steps along the path. Each entry in the matrix, T(i,x), represents the independent variable of an agent within the communications bus structure 10. The first variable, i, in the matrix represents the path of the root agent to the ith terminal agent. The second variable, x, in the matrix represents the xth step in the path of the root agent to the ith terminal agent.

To create the matrix T(i,x), the algorithm begins by clearing all marks and all entries in the matrix T(i,x) (Step 2010). The algorithm then sets i (representing the number of paths of the root agent to terminal agents) to 1 (Step 2020) and sets x (representing the xth step in the path of the root agent to the ith terminal agent) to 1 (Step 2030). The algorithm then begins to build the matrix T(i,x) by beginning at the root agent (Step 2040) and obtaining the root agents's independent variable and enters it into the matrix at entry T(i,x) (Step 2050). The algorithm next proceeds to an unmarked agent at the next lower level in the hierarchy (Step 2060) and adds 1 to x (Step 2070). The algorithm next obtains this agent's independent variable and enters it into the matrix at entry T(i,x) (Step 2080). The algorithm next determines if the agent is a terminal agent (Step 2090). If the agent is not a terminal agent, the algorithm proceeds to an unmarked agent at the next lower level in the hierarchy (Step 2060) and continues from there. If the agent is a terminal agent, the algorithm marks the agent (Step 2100) and determines if the iteration i is equal to N (Step 2110). If i is equal to N, then the matrix T is complete because all paths between the root agent and the N terminal agents have been recorded and this stage of the algorithm is concluded. If i is less than N, then the algorithm adds 1 to i (Step 2120). The algorithm next proceeds to the agent at the next higher level (Step 2130) and determines whether all agents in the next lower level are marked (Step 2140). If all agents in the next lower level are marked, the algorithm marks the agent at the current level (Step 2150) and proceeds to the agent at the next higher level (Step 2130) and continues from there. If all agents in the next lower level are not marked, the algorithm resets x to 1 and proceeds to begin tracing the next path (Step 2030). The marking of agents in this manner is necessary so that the algorithm will not duplicate the recording of a path of the root agent to a terminal agent using each agent's independent variable for identification of steps along the path.

Once the matrix T(i,x) is built via the above method or any other method, the algorithm may proceed to the third stage 3000, an embodiment of which is shown in FIG. 2C. The third stage 3000 of the algorithm is designed to wait until a loss of state event may have taken place. Such a loss of state event may be, for example, a power loss, a system reset, or the addition or removal of an agent. Once this occurs, the algorithm determines if an agent switch has taken place by creating a new comparative matrix U(i,x). As in T(i,x), each entry in the matrix, U(i,x), represents the independent variable of an agent within the communications bus structure 10. The first variable, i, in the matrix represents the path of the root agent to the ith terminal agent. The second variable, x, in the matrix represents the xth step in the path of the root agent to the ith terminal agent. As the algorithm builds the comparative matrix U(i,x), the algorithm compares entries in U(i,x) with their corresponding entries in the T(i,x) matrix. If all of the entries match, then an agent switch did not occur during the possible loss of state event. If all of the entries do not match then an agent switch did occur during the possible loss of state events. This comparison assumes that that selection of unmarked agents at the next lower level is done consistently in both the algorithms to construct the matrices T(i,x) and U(i,x).

As shown in FIG. 2C, the algorithm determines at regular intervals whether or not a potential loss of state event has occurred (Step 3010) and, if no such event has occurred, continues to determine whether a potential loss of state event has occurred (Step 3010). If a potential loss of state event has occurred, the algorithm proceeds to create the comparative matrix U(i,x). To create the comparative matrix U(i,x), the algorithm begins by clearing all marks and all entries in the matrix U(i,x) (Step 3020). The algorithm then sets i (representing the number of paths of the root agent to terminal agents) to 1 (Step 3030) and sets x (representing the xth step in the path of the root agent to the ith terminal agent) to 1 (Step 3040). The algorithm then begins to build the comparative matrix U(i,x) by beginning at the root agent (Step 3050), proceeding to an unmarked agent at the next lower level in the hierarchy (Step 3060) and adding 1 to x (Step 3070). The algorithm next obtains this agent's independent variable and enters it into the matrix at entry U(i,x) (Step 3080). The algorithm then compares the entry U(i,x) with its corresponding entry in the matrix T(i,x) (Step 3090). If the entries do not match, then an agent switch has occurred during the potential loss of state event (Step 3170). The algorithm may then notify other portions of the communications bus 10 or the host 20 to take action based on the agent switch. One such action may be resetting the algorithm to begin anew at the first stage 1000 (Step 1010).

If the entries U(i,x) and T(i,x) do match, then an agent switch may not have occurred during the potential loss of state event. The algorithm next marks the agent (Step 3110) and determines if i is equal to N (Step 3120). If i is equal to N, then the formation of comparative matrix U(i,x) is complete and, because all entries in comparative matrix U(i,x) match their corresponding entries T(i,x), an agent switch did not occur (Step 3180). The algorithm may then notify other portions of the communications bus 10 or the host 20 to take action based on the determination that no agent switch occurred. One such action may be resetting the algorithm to begin anew at the third stage 3000 (Step 3010) to wait for another potential loss of state event.

If i is not equal to N, then the algorithm adds 1 to i (Step 3130). The algorithm next proceeds to the agent at the next higher level (Step 3140) and determines whether all agents in the next lower level are marked (Step 3150). If all agents in the next lower level are marked, the algorithm marks the agent at the current level (Step 3160) and proceeds to the agent at the next higher level (Step 3140) and continues from there. If all agents in the next lower level are not marked, the algorithm resets x to 1 and proceeds to begin tracing the next path (Step 3040). The marking of agents in this manner is necessary so that the algorithm will not duplicate the recording of a path of the root agent to a terminal agent using each agent's independent variable for identification of steps along the path.

In an alternative embodiment of the third stage 3000 of the algorithm, the algorithm first forms the comparative matrix U(i,x) in its entirety and then compare the matrices T(i,x) and U(i,x). If all entries of the matrices T(i,x) and U(i,x) are identical, then no agent switch has occurred during the potential loss of state event. If at least one of the entries of the matrices T(i,x) and U(i,x) are not identical, then at least one agent switch has occurred during the potential loss of state event.

One implementation of the present invention may take place on a PCI communications bus, which is known in the art. The PCI bus communicates with the microprocessor via a host, which coordinates the PCI bus with other operations of the microprocessor. The host may operate as the host 20 as illustrated in FIG. 1. The host is not a part of the PCI bus architecture. The PCI bus itself is a multilevel, hierarchical bus structure where the agents in one level of the hierarchy are uniquely associated with one and only one agent located on the immediately higher level in the hierarchy. The highest level of the PCI bus hierarchy may include one or more Host-to-PCI bridges each interfacing with the host. A Host-to-PCI bridge may operate as the root agent 60 as illustrated in FIG. 1. A lower level of the PCI hierarchy may include one or more PCI-to-PCI bridges each interfacing with a Host-to-PCI bridge. Among other functions, the PCI-to-PCI bridge acts as a conduit to maintain the integrity of the instructions from the host to the agents on the PCI bus that perform the desired operations. A still lower level of the PCI hierarchy may include one or more PCI devices each interfacing with a PCI-to-PCI bridge. PCI-to-PCI bridges and PCI devices may operate as bridge agents 70–90 as illustrated in FIG. 1. Each PCI device may perform operations such as video, audio, or data processing. An even still lower level of the PCI hierarchy may include one or more PCI functions each interacting with only one PCI device. PCI functions may operate as terminal agents 100–160 as illustrated in FIG. 1.

Each agent on the PCI bus may be identified by at least three numbers: bus, device, and function. A bus number is determined by the location of the PCI device in relation to any Host-to-PCI and PCI-to-PCI bridges in the system. The bus number of a given PCI device varies depending on the addition or removal of Host-to-PCI and PCI-to-PCI bridges. A device number is associated either with a specific physical PCI slot in the system or is assigned by the manufacturer of the add-in device. Within the scope of each bus, there is a maximum of 32 devices and each device number may only be used once per bus. The function number is also assigned by the manufacturer. Within the scope of each device, there is a maximum of 8 functions and each function number may only be used once per device. The bus number is a dependent variable because its value may change due to removal, addition, replacement, or movement of other agents in the PCI hierarchy. The device and function numbers are independent variables because their values remain constant regardless of the removal, addition, replacement, or movement of other agents in the PCI hierarchy. Because the device and function numbers are independent variables, their two values combined serve as the variable entered into the matrix T(i,x) and the comparative matrix U(i,x) to uniquely identify each agent as described in FIGS. 2A, 2B, and 2C.

Accordingly, the present invention allows for the efficient determination of whether a switch has occurred during a potential loss of state event. It will be appreciated by those skilled in the art that the specific embodiments disclosed above may be readily utilized as a basis for modifying or designing other methods and techniques for carrying out the same purposes of the present invention. It should also be realized by those skilled in the art that such equivalent constructions do not depart from the spirit and scope of the invention as set forth in the following claims.

We claim:

1. A method for tracing agents, comprising:

determining a number of terminal agents within a hierarchical agent system;

forming a first matrix containing data identifying a plurality of agents within the hierarchical agent system;

determining whether a potential loss of state event has occurred;

forming a second matrix containing data identifying a plurality of agents within the hierarchical agent system, wherein the data identifying a plurality of agents contained in the first and second matrices includes data tracing a path from a root agent to each of the plurality of agents; and comparing the first matrix to the second matrix to determine if at least one agent switch occurred.

2. The method as in claim 1, wherein determining the number of terminal agents comprises:

determining if there is a marked agent at the next lower level;

determining if the agent at the next higher level is a host agent;

marking an agent; and determining if an agent is a terminal agent.

3. The method as in claim 1, wherein forming a first matrix comprises:

obtaining data identifying a particular agent;

determining if an agent is a terminal agent;

marking an agent; and determining if all agents at the next lower level are marked.

4. The method as in claim 1, wherein forming a second matrix comprises:

obtaining data identifying a particular agent;

determining if an agent is a terminal agent;

marking an agent; and determining if all agents at the next lower level are marked.

5. The method as in claim 1, wherein comparing the first matrix to the second matrix comprises:

comparing data from the first matrix corresponding to a particular agent with data from the second matrix corresponding to the same particular agent.

6. The method as in claim 1, wherein the loss of state event is a loss of power.

7. The method as in claim 1, wherein the loss of state event is a system reset.

8. The method as in claim 1, wherein the loss of state event is the addition of an agent within the hierarchical agent system.

9. The method as in claim 1, wherein the loss of state event is the removal of an agent within the hierarchical agent system.

10. A method for tracing agents, comprising:

determining a number of PCI terminal agents within a hierarchical PCI agent system;

forming a first matrix containing data identifying a plurality of PCI agents within the hierarchical PCI agent system;

determining whether a potential loss of state event has occurred;

forming a second matrix containing data identifying a plurality of PCI agents within the hierarchical PCI agent system, wherein the data identifying a plurality of PCI agents contained in the first and second matrices includes data tracing a path from a root PCI agent to each of the plurality of PCI agents; and comparing the first matrix to the second matrix to determine if at least one PCI agent switch occurred.

11. The method as in claim 10, wherein determining the number of terminal agents comprises:

determining if there is a marked PCI agent at the next lower level;

determining if the agent at the next higher level is a host-to-PCI bridge agent;

marking a PCI agent; and determining if a PCI agent is a PCI terminal agent.

12. The method as in claim 10, wherein forming a first matrix comprises:

obtaining data identifying a particular PCI agent;

determining if a PCI agent is a PCI terminal agent;

marking a PCI agent; and determining if all PCI agents at the next lower level are marked.

13. The method as in claim 10, wherein comparing the first matrix to the second matrix comprises:

comparing data from the first matrix corresponding to a particular PCI agent with data from the second matrix corresponding to the same particular PCI agent.

14. The method as in claim 10 further comprising:

if the first matrix is not equal to the second matrix, signaling that a loss of state event occurred.

15. The method as in claim 10, wherein the loss of state event is a loss of power.

16. The method as in claim 10, wherein the loss of state event is a system reset.

17. The method as in claim 10, wherein the loss of state event is the addition of a PCI agent within the hierarchical PCI agent system.

18. The method as in claim 10, wherein the loss of state event is the removal of a PCI agent within the hierarchical PCI agent system.

19. A method for tracing agents, comprising:

determining a number of PCI terminal agents within a hierarchical PCI agent system;

forming a first matrix containing data identifying a plurality of PCI agents within the hierarchical PCI agent system, the data consisting of a bus variable and a function variable;

determining whether a potential loss of state event has occurred;

forming a second matrix containing data identifying a plurality of PCI agents within the hierarchical PCI agent system, the data consisting of a bus variable and a function variable; and comparing the first matrix to the second matrix.

20. The method as in claim 19, wherein determining the number of terminal agents comprises:

determining if there is a marked PCI agent at the next lower level;

determining if the agent at the next higher level is a host-to-PCI bridge agent;

marking a PCI agent; and determining if a PCI agent is a PCI terminal agent.

21. The method as in claim 19, wherein forming a first matrix comprises:

obtaining data identifying a particular PCI agent;

determining if a PCI agent is a PCI terminal agent;

marking a PCI agent; and determining if all PCI agents at the next lower level are marked.

22. The method as in claim 19, wherein forming a second matrix comprises:

obtaining data identifying a particular PCI agent;

determining if an agent is a PCI terminal agent;

marking a PCI agent; and determining if all PCI agents at the next lower level are marked.

23. The method as in claim 19, wherein comparing the first matrix to the second matrix comprises:

comparing data from the first matrix corresponding to a particular PCI agent with data from the second matrix corresponding to the same particular PCI agent.

24. The method as in claim 19 further comprising:

if the first matrix is not equal to the second matrix, signaling that a loss of state event occurred.

25. The method as in claim 19, wherein the loss of state event is a loss of power.

26. The method as in claim 19, wherein the loss of state event is a system reset.

27. The method as in claim 19, wherein the loss of state event is the addition of a PCI agent within the hierarchical PCI agent system.

28. The method as in claim 19, wherein the loss of state event is the removal of a PCI agent within the hierarchical PCI agent system.

* * * * *